United States Patent [19]

Milstein et al.

[11] 4,054,508

[45] Oct. 18, 1977

[54] DEMETALATION AND DESULFURIZATION OF RESIDUAL OIL UTILIZING HYDROGEN AND TRICKLE BEDS OF CATALYSTS IN THREE ZONES

[75] Inventors: Donald Milstein, Cherry Hill, N.J.; Ronald H. Fischer, Oakton, Va.

[73] Assignee: Mobil Oil Corporation, New York, N.Y.

[21] Appl. No.: 754,813

[22] Filed: Dec. 27, 1976

Related U.S. Application Data

[63] Continuation-in-part of Ser. No. 551,948, Feb. 21, 1975, Pat. No. 4,016,067.

[51] Int. Cl.$^2$ .................................................. C10G 23/02
[52] U.S. Cl. .................................................. 208/89; 208/210
[58] Field of Search .................... 208/210, 216 PP, 89

[56] References Cited

U.S. PATENT DOCUMENTS

| | | | |
|---|---|---|---|
| 3,663,434 | 5/1972 | Bridge | 208/216 |
| 3,730,879 | 5/1973 | Christman et al. | 208/210 |
| 3,766,058 | 10/1973 | Hensley, Jr. | 208/216 |
| 3,876,523 | 4/1975 | Rosinski et al. | 208/89 |
| 4,006,076 | 2/1977 | Christensen et al. | 208/89 |
| 4,014,821 | 3/1977 | Hamner | 208/216 |
| 4,016,067 | 4/1977 | Fischer et al. | 208/210 |

*Primary Examiner*—George Crasanakis
*Attorney, Agent, or Firm*—Charles A. Huggett; Vincent J. Frilette

[57] ABSTRACT

This invention is concerned with removing metal and sulfur contaminants from residual oil fractions by catalytic contact with two different catalysts in the presence of hydrogen. In this process, the oil is first contacted with the major fraction of a catalyst comprising a Group VIB metal and an iron group metal oxide, such as a mixture of cobalt and molybdenum oxides, composited with an alumina support, the catalyst having at least 60% of its pore volume in pores of 100A to 200A diameter and at least about 5% of its pore volume in pores having a diameter greater than 500A. The oil is then contacted with a second catalyst of the high surface-area, cobalt-molybdenum on alumina type having a major fraction of its pores in the 30 to 100A diameter range. Finally, the oil is contacted with the remainder of the large-pore catalyst.

6 Claims, 8 Drawing Figures

○ SMO 8066
□ CATALYST A

DEMETALATION AND DESULFURIZATION OF RESIDUAL OIL UTILIZING HYDROGEN AND TRICKLE BEDS OF CATALYSTS IN THREE ZONES

CROSS REFERENCE TO RELATED APPLICATIONS

This application is a continuation-in-part of U.S. patent application Ser. No. 551,948 filed Feb. 21, 1975, which issued as U.S. Pat. No. 4,016,067

BACKGROUND OF THE INVENTION

1. Field of the Invention

This invention is concerned with an improved catalytic process for the demetalation and desulfurization of petroleum oils, preferably those residual fractions that have undesirably high metals and/or sulfur content. More particularly, the invention involves two catalysts with distinctly different pore sizes, arranged in a three-zone system that is especially effective for the demetalation and desulfurization of petroleum oils. Both catalysts are exemplified by the cobalt-molybdenum on alumina type.

2. Description of the Prior Art

Residual pertroleum oil fractions produced by atmospheric or vacuum distillation of crude petroleum are characterized by relatively high metals and sulfur content. This comes about because practically all of the metals present in the original crude remain in the residual fraction, and a disproportionate amount of sulfur in the original crude oil also remains in that fraction. Principal metal contaminants are nickel and vanadium, with iron and small amounts of copper also sometimes present. Additionally, trace amounts of zinc and sodium are found in some feedstocks. The high metals content of the residual fractions generally preclude their effective use as charge stocks for subsequent catalytic processing such as catalytic cracking and hydrocracking. This is so because the metal contaminants deposit on the special catalysts for these processes and cause the formation of inordinate amounts of coke, dry gas and hydrogen.

It is current practice to upgrade certain residual fractions by a pyrolitic operation known as coking. In this operation the residuum is destructively distilled to produce distillates of low metals content and leave behind a solid coke fraction that contains most of the metals. Coking is typically carried out in a reactor or drum operated at about 800° to 1100° F temperature and a pressure of one to ten atmospheres. The economic value of the coke by-product is determined by its quality, especially its sulfur and metals content. Excessively high levels of these contaminants makes the coke useful only as low-valued fuel. In contrast, cokes of low metals content, for example up to about 100 p.p.m. (parts-per-million by weight) of nickel and vanadium, and containing less than about 2 weight percent sulfur may be used in high valued metallurigical, electrical, and mechanical applications.

Certain residual fractions are currently subjected to visbreaking, which is a heat treatment of milder conditions than used in coking, in order to reduce their viscosity and make them more suitable as fuels. Again, excessive sulfur content sometimes limits the value of the product.

Residual fractions are sometimes used directly as fuels. For this use, a high sulfur content in many cases is unacceptable for ecological reasons.

At present, catalytic cracking is generally done utilizing hydrocarbon chargestocks lighter than residual fractions which generally have an API gravity less than 20. Typical cracking chargestocks are coker and/or crude unit gas oils, vacuum tower overhead, etc., the feedstock having an API gravity from about 15 to about 45. Since these cracking chargestocks are distillates, they do not contain significant proportions of the large molecules in which the metals are concentrated. Such cracking is commonly carried out in a reactor operated at a temperature of about 800° to 1500° F, a pressure of about 1 to 5 atmospheres, and a space velocity of about 1 to 1000 WHSV.

The amount of metals present in a given hydrocarbon stream is often expressed as a chargestock's "metals factor." This factor is equal to the sum of the metals concentrations, in parts per million, of iron and vanadium plus ten times the concentration of nickel and copper in parts per million, and is expressed in equation form as follows:

$$F_m = Fe + V + 10(Ni + Cu)$$

Conventionally, a chargestock having a metals factor of 2.5 or less is considered particularly suitable for catalytic cracking. Nonetheless, streams with a metals factor of 2.5 to 25, or even 2.5 to 50, may be used to blend with or as all of the feedstock to a catalytic cracker, since chargestocks with metals factors greater than 2.5 in some circumstances may be used to advantage, for instance with the newer fluid cracking techniques.

In any case, the residual fractions of typical crudes will require treatment to reduce the metals factor. As an example, a typical Kuwait crude, considered of average metals content, has a metals factor of about 75 to about 100. As almost all of the metals are combined with the residual fraction of a crude stock, it is clear that at least about 80% of the metals and preferably at least 90% needs to be removed to produce fractions (having a metals factor of about 2.5 to 50) suitable for cracking chargestocks.

Metals and sulfur contaminants present similar problems with regard to hydrocracking operations which are typically carried out on chargestocks even lighter than those charged to a cracking unit. Hydrocracking catalyst is so sensitive to metals poisoning that a preliminary or first stage is often utilized for trace metals removal. Typical hydrocracking reactor conditions consist of a temperature of 400° to 1,000° F and a pressure of 100 to 3,500 p.s.i.g.

It is evident that there is considerable need for an efficient method to reduce the metals and/or sulfur content of petroleum oils, and particularly of residual fractions of these oils. While the technology to accomplish this for distillate fractions has been advanced considerably, attempts to apply this technology to residual fractions generally fail due to very rapid deactivation of the catalyst, presumably by metals contaminants.

U.S. Pat. No. 3,730,879 issued May 1, 1973 discloses a two-bed catalytic process for the hydrodesulfurization of crude oil or a reduced fraction, in which at least 50 percent of the total pore volume of the first-bed catalyst consists of pores in the 100–200 Angstrom diameter range.

U.S. Pat. No. 3,830,720 issued Aug. 20, 1974 discloses a two-bed catalytic process for hydrocracking and hydrodesulfurization residual oils, in which a small pore catalyst is disposed upstream of a large-pore catalyst.

U.S. Pat. No. 3,696,027 issued Oct. 3, 1972 describes a three-bed catalytic process for desulfurization.

U.S. Pat. No. 3,876,523 issued Apr. 8, 1975 to Rosinski et al, describes a novel catalyst and a process for catalytically demetalizing and desulfurizing hydrocarbon oils comprising residual fractions. The entire specification of that patent is incorporated herein by reference. The process described therein utilizes a catalyst comprising a hydrogenation component, such as cobalt and molybdenum oxides, composited on an alumina at least a portion of which is in the delta and/or theta phase, with at least 60% of the pore volume of the catalyst in pores having a diameter of 100 to 200 Angstroms, also having at least about 5% of the pore volume contributed by pores having a diameter greater than 500 Angstroms and having other characteristics as hereinafter described. As will be shown, although this catalyst is highly effective for demetalation of residual fractions and has good stability with time on stream, its utility is remarkably improved when this catalyst is employed in a particular manner in combination with a second catalyst having different critical characteristics. For convenience, a catalyst of the type described in the above-mentioned U.S. Pat. No. 3,876,523 will be referred to herein as a first catalyst, it being understood that the major fraction of this first catalyst is to be situated upstream of the second catalyst having different characteristics, as hereinafter described.

SUMMARY OF THE INVENTION

It has now been discovered that hydrocarbon oils, preferably residual fractions, are catalytically hydroprocessed to very effectively remove both metals and sulfur and with particularly slow aging of the catalyst system by contacting the oil with two catalysts of different characteristics disposed in three distinct, sequential reaction zones. The first catalyst, the major fraction of which is located upstream of the second catalyst, is characterized by having at least 60% of its pore volume in pores greater than 100A in diameter and other characteristics hereinafter specified. The second catalyst, located downstream with respect to the first catalyst, is characterized by having a major fraction of its pore volume in pores less than 100A in diameter.

The novel process of this invention may be used to demetalize and/or desulfurize any hydrocarbon oil that has metals and/or sulfur content undesirably high for a particular application. It is particularly effective for preparing low metals and/or low sulfur content feedstocks for catalytic cracking or for coking. In the processing to remove metals and sulfur, the hydrocarbon oil also is concomitantly enriched in hydrogen, making it an even more suitable chargestock for either of these processes.

DETAILED DESCRIPTION OF THE INVENTION

The preferred first catalyst of the two catalyst system is selected from the class of catalysts comprising a hydrogenating component (cobalt and molybdenum in a preferred embodiment) composited with an alumina support. The preferred first catalyst also has at least 60% of its pore volume in pores having a diameter of about 100 to 200A, at least about 5% of the pore volume in pores greater than 500A in diameter, and in a particularly preferred form it may have a surface area of up to about 110 m$^2$/g. The first catalyst also may have a high-temperature phase delta and/or theta alumina present in sufficient quantity for it to be detectable by X-ray diffraction, i.e., a demonstrable content of delta and/or theta phase alumina.

Figure 1:
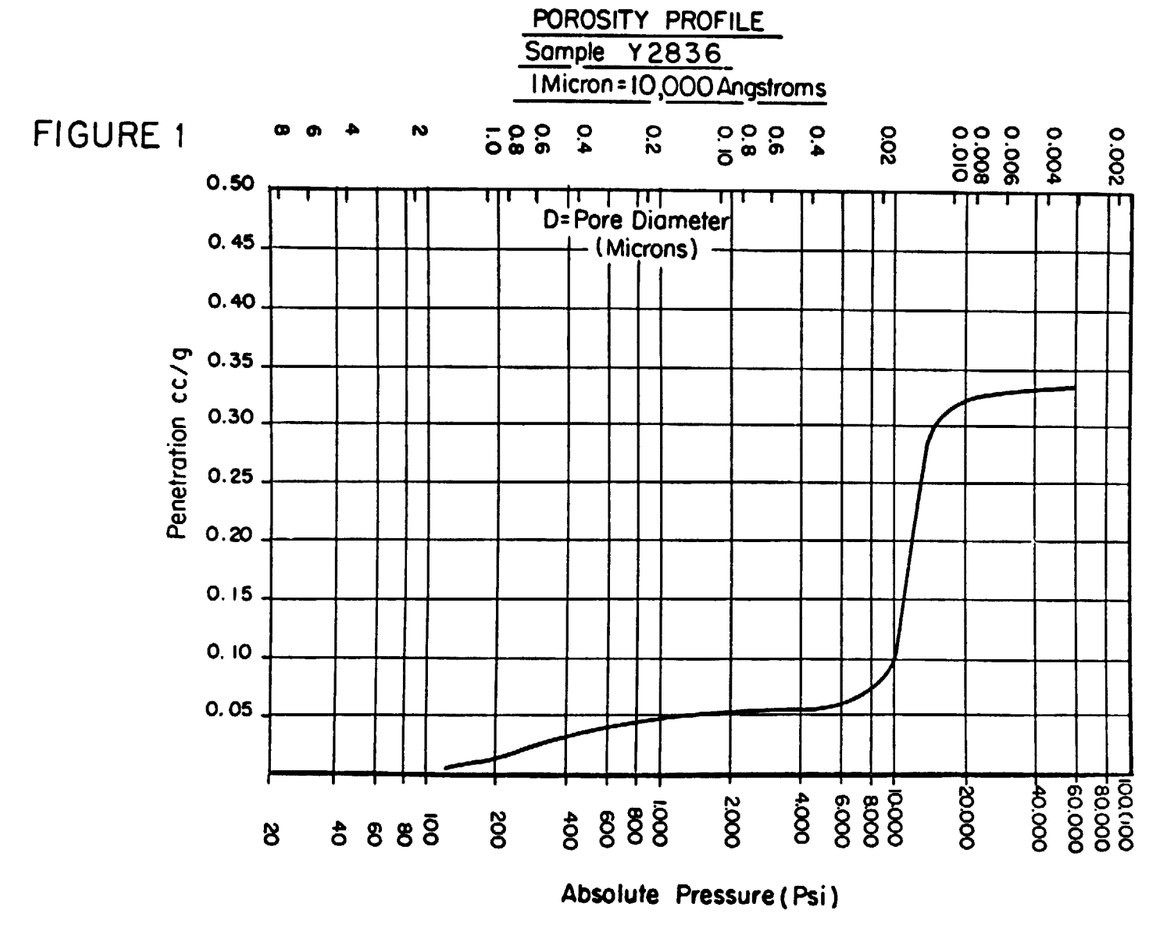
FIG. 1 is a porosity profile of a first catalyst of the class useful in this invention.
Figure 2:
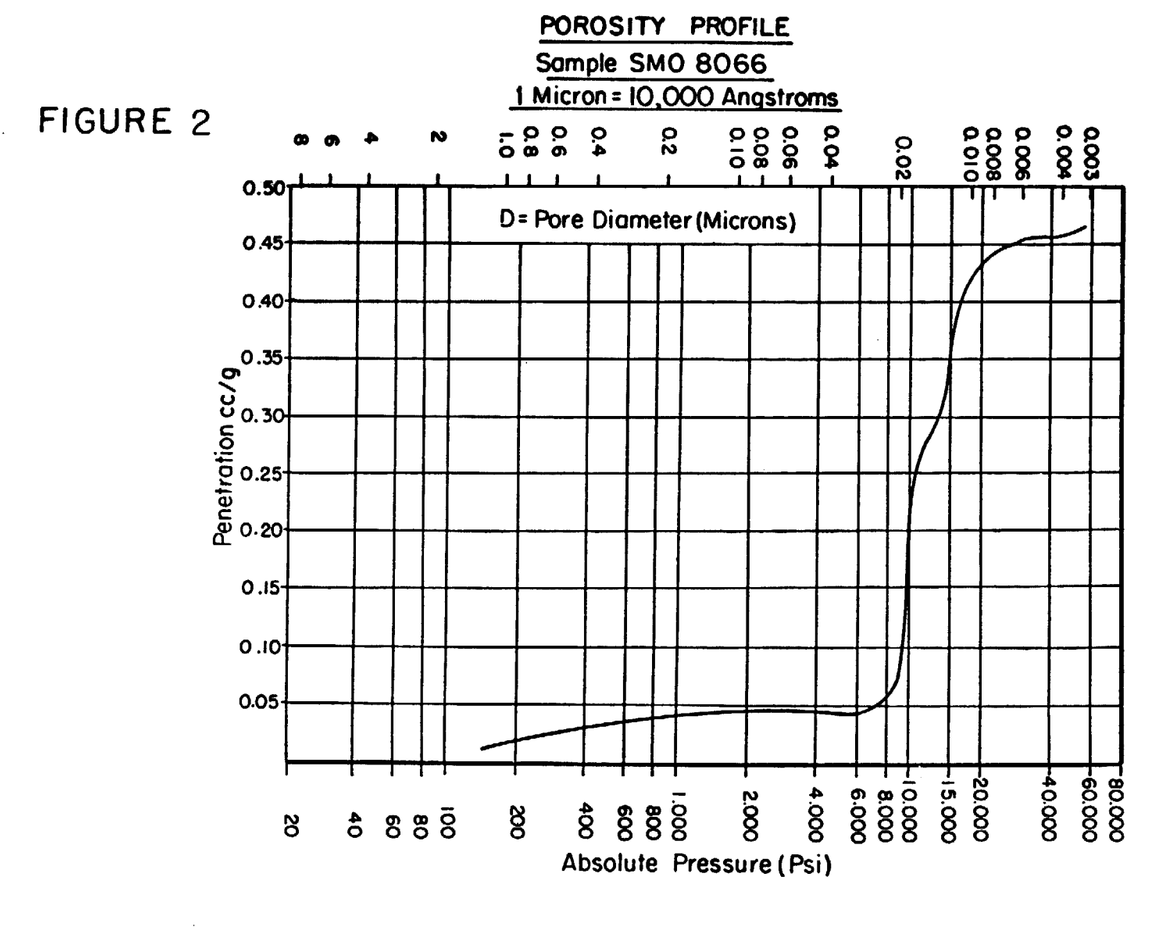
FIG. 2 is a porosity profile of another first catalyst of the class useful in this invention.

FIGS. 1 and 2 illustrate the porosity profiles of two catalysts of the class described. Such profiles are produced by plotting the amount of a fluid (in this case mercury) in cc/g forced into the pore structure as a function of pressure. As the pressure is increased, the mercury is forced into smaller and smaller pores. As is shown by these figures there is a dramatic increase in penetration with a small pressure increase, indicating that the structure has a large number of pores within a particular size range. The specific size is determined by a standard capillary tube equation calculation.

The second catalyst of the dual catalyst system of this invention is selected from the class of catalyst comprising a hydrogenation component (cobalt and molybdenum in a preferred embodiment) composited with a refractory base (alumina in a preferred embodiment), said composite catalyst having at least 50%, and preferably at least 60% of its pore volume contributed by pores that have a diameter of 30 to 100 angstroms, and a surface area of at least 150 square meters per germ, and preferably a surface area of at least 175 square meters per gram.

The hydrogenating component of the first and second catalysts disclosed herein can be any material or combination thereof that is effective to hydrogenate and desulfurize the chargestock under the reaction conditions utilized. For example, the hydrogenating component is selected from at least one member of the group consisting of Group VIB and the iron group metals in a form, such as metal oxides or sulfides, capable of promoting hydrogenation reactions. Especially effective catalysts for the purposes of this invention are those comprising molybdenum and at least one member of the iron group metals. Preferred catalysts are those containing cobalt and molybdenum, but other combinations of iron group metals and molybdenum may be used, such as iron, or zinc, or nickel and molybdenum, as well as combinations of nickel and molybdenum, cobalt and molybdenum, nickel and tungsten or other Group VIB or Group VIII metals of the Periodic Table taken singly or in combination. Particularly preferred compositions for the first and second catalysts to be used in the process of this invention are those that contain on a weight basis from about 2% to about 6 percent cobalt or nickel and from about 10 percent to about 16 percent molybdenum, the remainder consisting of alumina. These metals may be composited with the alumina by any of the known methods. In some cases, the alumina may contain a small amount, up to 10 percent, of silica.

It is well known by those skilled in the art that the characteristics of composited alumina catalysts, such as the first and second catalysts useful in the process of this invention, depend to a very large extent on the properties of the alumina support. The first catalyst herein referred to is believed to have an unusual and novel physical structure especially as reflected in its phase composition and in its distribution of pore sizes. While this is more fully described in U.S. Pat. No. 3,876,523 issued Apr. 8, 1975, it might be mentioned here that this catalyst may be prepared from a technical grade of boehmite, recovered from aluminum alkyl catalysts used in olefin polymerizations. Aside from a small amount of volatile organic alcohol, this boehmite has been found to be very pure, containing less than 0.01% of any silica, iron oxide, sodium oxide, and sulfur. Furthermore, in the preparation of the alumina support, the alumina is calcined to about 1950° F. This is about the transition point between the delta and theta alumina phase, and it is believed that the presence of either one or both of these phases in the catalyst is directly or indirectly responsible for the unusual properties of the first catalyst.

The second catalyst of this invention may be commercial hydrodesulfurization catalyst such as Catalyst HDS-1441 manufactured by American Cyanamid Corporation. Commercially available alumina supports may be obtained and impregnated with cobalt and molybdenum salts followed by calcination. As commonly prepared on a commercial scale, the size of the pores of such alumina supports is largely concentrated at about 50 Angstroms diameter, and the alumina is of the gamma variety.

While various particulate forms of the first and second catalysts may be used in the dual bed system of this invention, it is preferred to use extrudate of about 1/20 to 1/40 inch diameter.

Two configurations of the catalysts of this invention are illustrated in FIGS. 3A and 3B. Referring to FIG. 3A, a major fraction of the first catalyst 4 is disposed as a layer on top of a bed of second catalyst 5 contained in a reactor 3. The remainder of the first catalyst (4') is disposed as a layer below the second catalyst 5. In this single reactor configuration, the hydrocarbon oil is fed through line 1, and allowed to trickle through the three reaction zones 4, 5, 4' and exits through line 6. Hydrogen is fed to the system through line 2. The total effluent, comprising demetalized and desulfurized oil plus gaseous by-products and unused hydrogen is conducted by line 6 to a separator 7 where the gaseous products are disengaged and released through line 9. The treated oil exits from the separator 7 through line 8 and is recovered.

In a second configuration, illustrated by FIG. 3B, the major fraction of first catalyst 13 is contained in reactor 12 and the second catalyst 16 and remainder of first catalyst 13' are contained in a separate reactor 15. The hydrocarbon oil is introduced through line 10 into reactor 12 and trickles through the first catalyst 13, exiting through line 14 which feeds the oil then to reactor 15 where it trickles through the second catalyst 16, remainder of first catalyst 13', and exits through line 17. Hydrogen is fed to reactor 12 through line 11. The total effluent is carried by line 17 to a separator 18 where gaseous by-products and unused hydrogen are separated from the oil. The gaseous by-products are released through line 20, while the treated oil is discharged and recovered from line 19.

Figure 3:
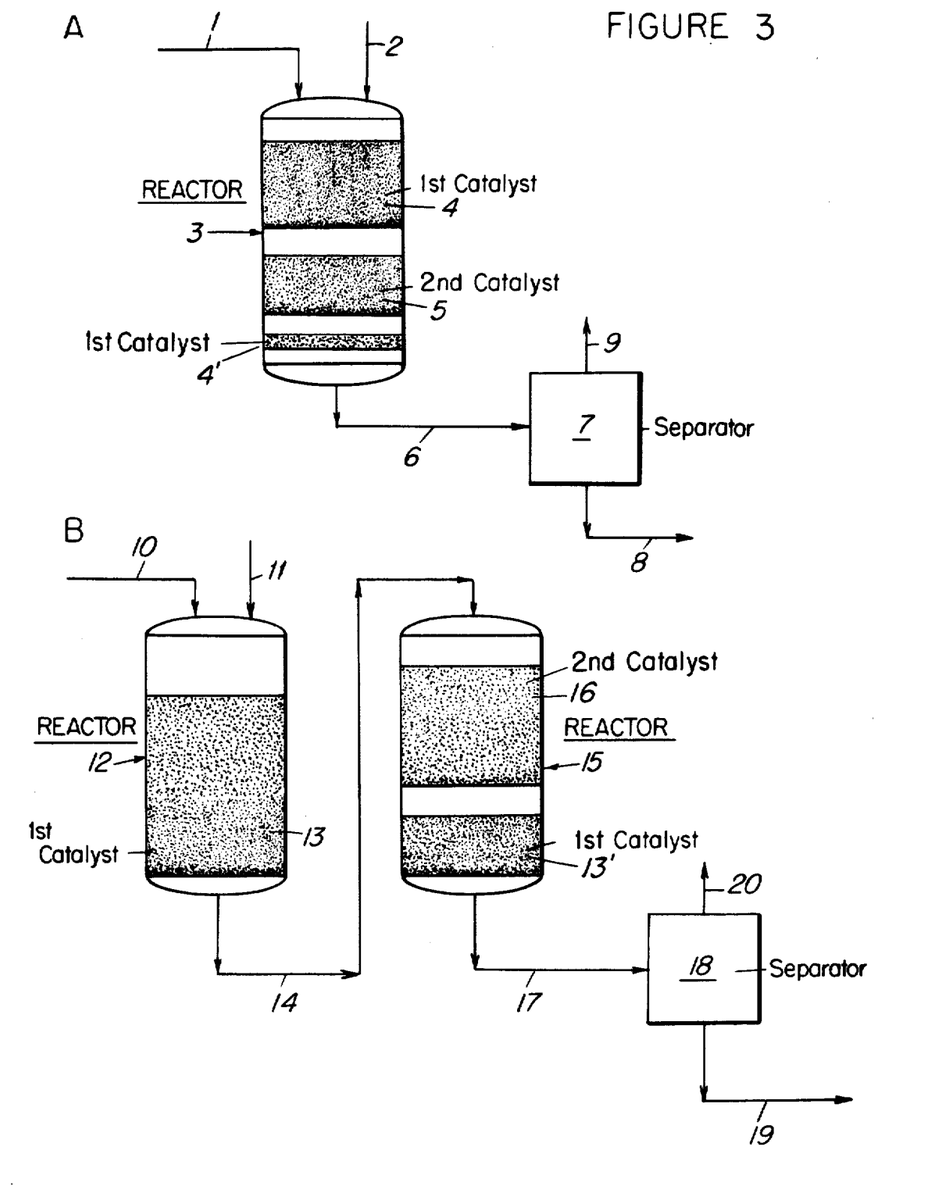
FIG. 3 illustrates two configurations: 3A utilizing a single reactor and 3B utilizing a plurality of reactors in accordance with this invention, including the disposition of the first catalyst in relation to the second catalyst.

It will be recognized that in both of the configurations shown in FIG. 3, the hydrocarbon feed contacts the major fraction of first catalyst before it contacts the second catalyst, i.e., the major fraction of first catalyst is disposed upstream of the second catalyst. The first catalyst contained in the first and third reaction zones preferably should be from about 40 to 80 percent of the total catalyst volume, the second catalyst occupying the corresponding remainder of from about 60 to 20 percent. The higher proportions of first catalyst are preferred when the metal contamination is relatively high compared with the sulfur contamination and vice versa. While it is to be understood that other catalyst configurations and modes of operation may be used in the practice of this invention, it is particularly preferred to operate the contacting of the feed with the three-zone system in trickle bed fashion.

The described manner of disposing the first and second catalysts which results in maintaining a low metals content in the treated oil is a three-zone arrangement, with a major fraction of the first catalyst placed in the first zone, the remaining minor fraction of the first catalyst placed in the third zone, which is downstream of the second zone. Thus, in such an arrangement one may use 50 percent first catalyst, 40 percent second catalyst, and 10 percent first catalyst in sequence going downstream, percentages meaning percent of total catalyst volume in each instance.

The three sequential reaction zones hereinabove described are essential to this invention. It is intended that these be distinct reaction zones, which may be formed in a single reactor by disposing the first and second catalysts in layers as shown in FIG. 3(A), with or without a space between the layers. The space between the layers may be provided, when desired, by any known means, such as the presence of supporting members, or by an intermediate layer of inert solids. The first reaction zone itself may be formed by layers of first catalyst separated by free space into which hydrogen may be injected as coolant to control the temperature in that zone. With such a free space between zones and with hydrogen coolant, the three zones may be controlled at substantially the same temperature, or at predetermined different temperatures within the range of about 600° to 850° F. In any case, as used herein, the term "reaction zone" means any one of three regions within a catalytic reactor, each of which region contains either first catalyst as hereinabove defined, and is substantially free of second catalyst, or vice versa.

For the purpose of this invention, a major fraction of the first catalyst is disposed in the first reaction zone. It is preferred, however, that the first reaction zone contain at least 60 percent of said first catalyst, with at least 5 percent of the first catalyst disposed in the third reaction zone. Thus, the first catalyst may be partitioned between the first and third reaction zones with 95 percent in the first, 5 percent in the third; 75 percent in the first and 25 percent in the third; or 60 percent in the first and 40 percent in the third. These ratios are given by way of illustration. In all cases, all, that is 100 percent, of the second catalyst, is contained in the second reaction zone.

Although presulfiding of the catalysts is preferred, this is not essential as the catalysts will normally become sulfided in a very short time by contact, at the process conditions disclosed herein, with the high sulfur content feedstocks to be used. The catalyst can be presulfided, after calcination, or calcination and reduction, prior to contact with the chargestock, by contact with a sulfiding mixture of hydrogen and hydrogen sulfide, at a temperature in the range of about 400°to 800° F, at atmospheric or elevated pressures. Presulfiding can be conveniently effected at the beginning of an onstream period at the same conditions to be employed at the start of such period.

From what has been said, it will be clear that the feedstock can be a whole crude. However, since the high metal and sulfur components of a crude oil tend to be concentrated in the higher boiling fractions, the present process more commonly will be applied to a bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil. Typical residues to which the present invention is applicable will normally be substantially composed of residual hydrocarbons boiling above 650° F and containing a substantial quantity of asphaltic materials. Thus, the chargestock can be one having an initial or 5 percent boiling point somewhat below 650° F, provided that a substantial porportion, for example, about 70 to 80 percent by volume, of its hydrocarbon components will boil above 650° F. A hydrocarbon stock having a 50 percent boiling point of about 900° F and which contains asphaltic materials, 4 percent by weight sulfur and 51 p.p.m. nickel and vanadium is illustrative of such chargestock. Typical process conditions may be defined as passing a mixture of hydrogen and a metal and/or sulfur contaminant-containing chargestock under a hydrogen pressure of about 500 to 3,000 p.s.i.g., at 600° to 850° F temperature, and 0.1 to 5 LHSV (i.e., 0.1 to 5 volumes of chargestock per volume of catalyst per hour) based on the total complement of catalyst contained in the three distinct, sequential reaction zones.

The hydrogen gas which is used during the hydrodemetalation-hydrodesulfurization is circulated at a rate between about 1,000 and 15,000 s.c.f./bbl. of feed and preferably between about 3,000 and 8,000 s.c.f./bbl. The hydrogen purity may vary from about 60 to 100 percent. If the hydrogen is recycled, which is customary, it is desirable to provide for bleeding off a portion of the recycle gas and to add makeup hydrogen in order to maintain the hydrogen purity within the range specified. The recycled gas is usually washed with a chemical absorbent for hydrogen sulfide or otherwise treated in known manner to reduce the hydrogen sulfide content thereof prior to recycling.

The physical characteristics and the demetalation and desulfurization activities of a typical first and second catalyst used in the dual bed system is shown in Table 1.

It is noted that the first catalyst is selective for demetalation, but still has reasonably good desulfurization activity. The second catalyst has low demetalation activity by comparison.

TABLE 1

|  | SMO-8066 First Catalyst | Second Catalyst | SMO-8112 Mixed Pore |
|---|---|---|---|
|  | ← 1/32" CoMo/Al$_2$O$_3$ → | | |
| Pore Volume, cc/g | 0.490 | 0.491 | 0.519 |
| Packed Density, g/cc | 0.752 | 0.786 | 0.710 |
| Surface Area, m$^2$/g | 104 | 286 | 264 |
| Pore Size Dist., % of pore volume, diameters, A, | | | |
| 0–30 | 4 | 7 | 12 |
| 30–100 | 10 | 90 | 55 |
| 100–200 | 67 | 1 | 8 |
| 200–300 | 10 | 0 | 8 |
| >500 | 9 | 2 | 17 |
| Catalyst Activity[1] | | | |
| % Desulfurization | 74 | 78 | 75 |
| % Demetalation | 82 | 52 | 76 |

[1]Kuwait Atm. Resid, 2000 psig, 0.75 LHSV, 700° F, 5000 SCF H$_2$/B.

Table 2 compares the fresh and aged activities of the dual catalyst sequence described in U.S. patent application Ser. No. 551,948, of which this application is a continuation-in-part, with the reversed sequence in which the second catalyst is disposed upstream of the first catalyst.

TABLE 2

| | Demetallation and Desulfurization, Kuwait Atmospheric Resid* | | | | | |
|---|---|---|---|---|---|---|
| | FIRST CATALYST UPSTREAM | | | SECOND CATALYST UPSTREAM | | |
| Approximate Temperature, ° F | 675° | 725° | 775° | 675° | 725° | 775° |
| FRESH CATALYST | | | | | | |
| % Demetallation | 67 | 83 | 97 | 52 | 76 | 98 |
| % Desulfurization | 67 | 82 | 94 | 66 | 85 | 96 |
| AGED CATALYST** | | | | | | |
| % Demetallation | 42 | 63 | 84 | 33 | 63 | 81 |
| % Desulfurization | 48 | 68 | 86 | 36 | 57 | 74 |

*Run conditions: 2000 psig, approximately 0.7 LHSV, hydrogen circulation 3150-5615 scf/bbl.
**The catalyst was aged for 35 days running an atm. resid. at 2000 psig, 0.6 LHSV, 725-765° F, prior to the tests shown.

Figure 4A:
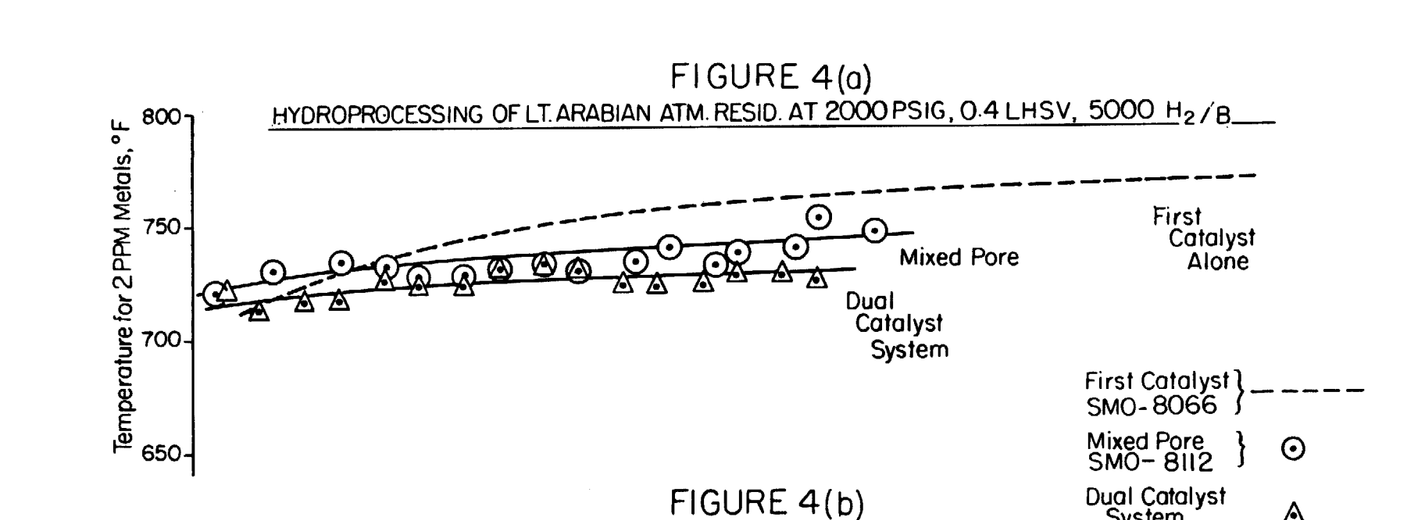
FIG. 4(a) and 4(b) show two sets of curves demonstrating the improved stability with time on stream for metals and sulfur removal of the dual catalyst system described in U.S. patent application Ser. No. 551,948, of which this application is a continuation-in-part.
Figure 4B:
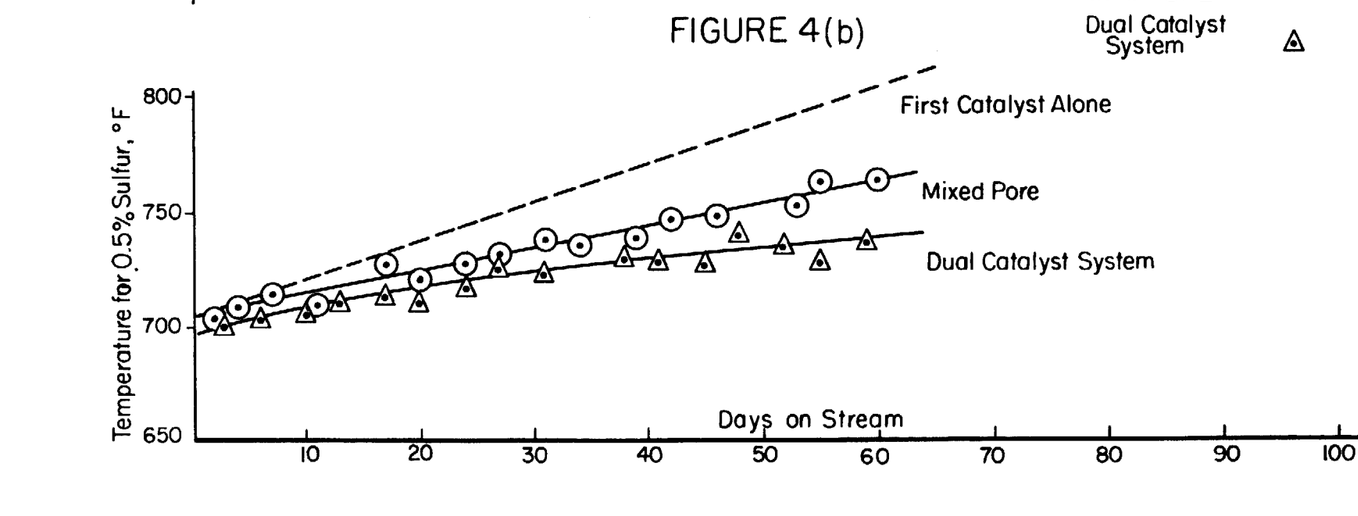

FIG. 4(a) demonstrates the slower aging for demetalation of the dual catalyst system described in U.S. patent application Ser. No. 551,948, of which this application is a continuation-in-part, compared with a single bed of the first catalyst alone, and with a single bed of another catalyst. That the slower aging applies to desulfurization as well as to demetalation is shown in FIG. 4(b).

It is not clear mechanistically exactly how the two catalysts cooperate to produce the unexpectedly improved aging in the process of this invention. While not wishing to be bound by theory, it may be proposed that the novel first catalyst, which is selective for demetalation, protects the second catalyst from metals poisoning and fast loss of desulfurization effectiveness. The second catalyst, being highly effective for desulfurization, may contribute to the longevity of the first catalyst by contributing, in a progressively increasing degree with time on stream, to the demetalation of the feed.

While not wishing to be bound by any particular theory of operability, it is felt that the uniqueness of the first catalyst used in the process of this invention is at least partially due to the fact that the alumina catalyst base is calcined to the transition temperature of the delta and theta phases, thereby producing a specific alumina. It is felt that it is this high-temperature phase which may produce the distinct pore structure and properties of the catalyst. The particular method of preparation of a preferred catalyst useful in this invention is explained in detail in Example 4 of U.S. Pat. No. 3,876,523 issued Apr. 8, 1975, which example is incorporated herein by reference.

As noted in Alumina Properties p. 46 by Newsome, Heiser, Russell and Stumpf (Alcoa Research Laboratories, 1960), the theta alumina phase may only be reached through employing an alpha monohydrate or a beta trihydrate alumina form. Calcining temperatures required to achieve the theta phase vary depending on which alumina form is utilized as the initial alumina. An alpha monohydrate enters the gamma phase at about 500° C, crosses the transition point into the delta phase at about 860° C and enters the narrowly temperature banded theta phase at about 1060° C. The transition point between theta and alpha phases being at about 1150° C.

Figure 5:
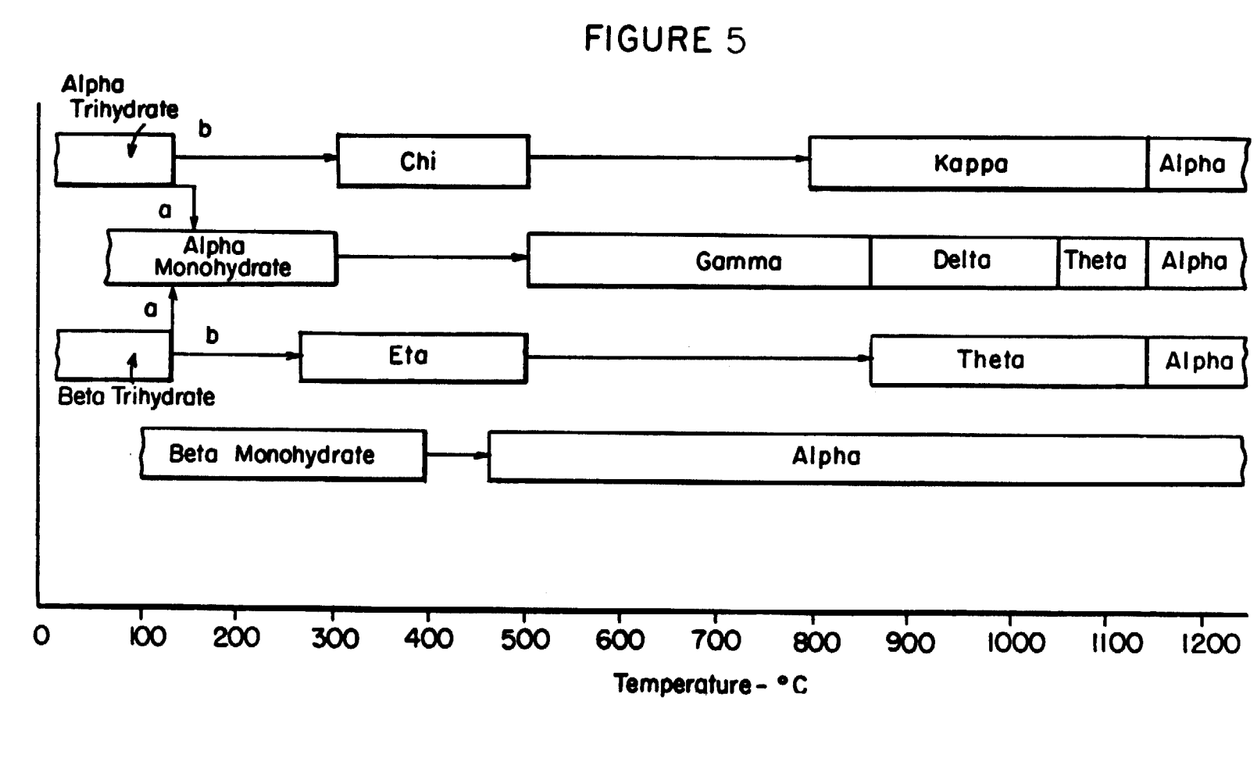
FIG. 5 is an alumina phase diagram.

When utilizing a beta trihydrate as an initial alumina, the theta phase is broader, its limits being about 860° to about 1160° C. It should be noted that both beta trihydrate and alpha trihydrate aluminas may also be transformed into the alpha monohydrate form. The alumina phase diagram is presented in FIG. 5.

In certain circumstances, first catalysts of relatively low surface areas and having a demonstrable content of high temperature phase alumina but with a somewhat larger pore size than given above may be used. Such catalysts are described in U.S. Pat. No. 3,891,541 issued June 24, 1975 to Oleck et al, the entire content of which is incorporated herein by reference.

Figure 6:
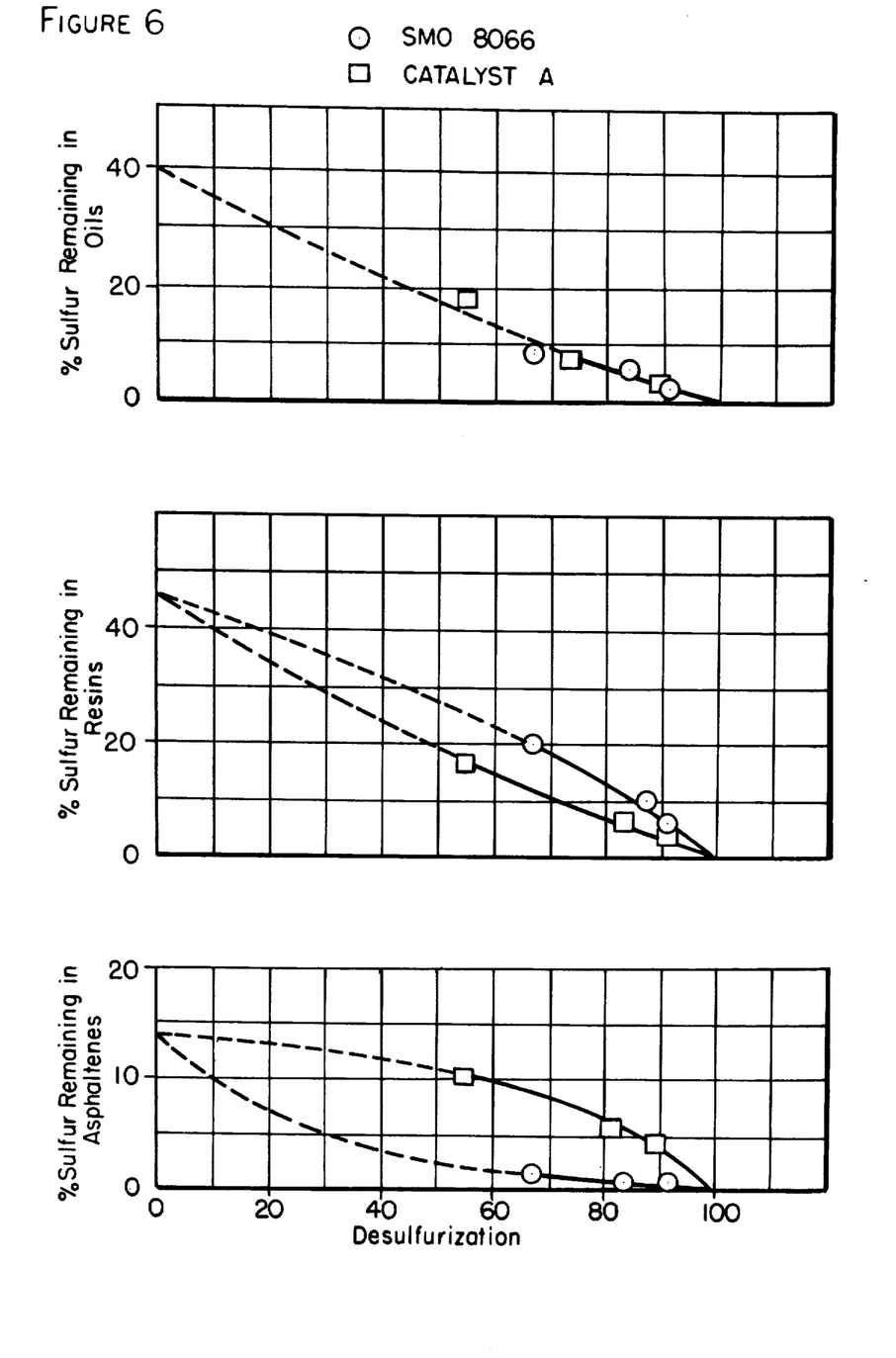
FIG. 6 is a curve showing desulfurization selectivity.

The first catalysts herein described have been found to have a selectivity for desulfurizing asphaltenic and resinous components of crude oil or residua, as shown in FIG. 6. This feature is of interest since it could be related to the unexpected effectiveness of the three-zone system, and to reduced sulfur emission from regenerators when oils processed by this invention are subjected to a subsequent cracking operation.

The following example illustrates the improved aging behavior of a two catalyst system, using equal volumes of first catalyst and second catalyst, when the first catalyst is disposed in three distinct, sequential reaction zones compared with two reaction zones. The example is given by way of illustration and is not to be construed as limiting this invention in any way, which limitations are expressed in the claims.

EXAMPLE

Equal volumes of first catalyst (SMO-8066) and second catalyst (Cyanamid HDS-1441) were disposed in three sequential reaction zones with 60 percent of the first catalyst in the first zone, 40 percent in the third zone. The entire 100 percent of second catalyst was placed in the second reaction zone. A comparison was made with the same volumes of the same first catalyst and the same second catalyst in a two-zone arrangement, all of the first catalyst being placed in the first zone. The two arrangements were aged in a test reactor for 30 days with Light Arabian vacuum residua at 2000 psig, 750°-780° F temperature, and at 0.5 LHSV. At the end of the aging period each of the two arangements were evaluated for demetalation and desulfurization activity using Kuwait atmospheric residua at 2000 psig, 725° F, 0.75 LHSV for both tests, with the following results:

|  | Sequential Reaction Zones | |
| --- | --- | --- |
|  | Three | Two |
| Metals (Ni + V), ppm wt. | 11.2 | 16.8 |
| Sulfur, % wt. | 1.45 | 1.59 |

What is claimed is:

1. A method for demetalizing and desulfurizing a residual oil which comprises passing a mixture of hydrogen and said oil at a hydrogen pressure of 500 to 3000 psig, a temperature of about 600° to 850° F, and a space velocity of 0.1 to 5.0 LHSV, through trickle beds of catalysts disposed in three sequential reaction zones, the first zone containing a relatively larger bed of a said first catalyst, the third zone containing a relatively smaller bed of said first catalyst, and the second zone located between said first zone and said third zone containing a second catalyst, said first catalyst and said second catalyst comprising the oxides or sulfides of a Group VIB metal and an iron group metal on an alumina support, said first catalyst having at least 60 percent of its pore volume in pores with diameters of about 100 to 200A and at least about 5 percent of its pore volume in pores greater than 500A diameter, and said second catalyst having a surface area of at least 150 m²/g and at least 50 percent of its pore volume in pores with diameters of 30 to 100A.

2. The process as claimed in claim 1 wherein said three sequential reaction zones are contained in one reactor.

3. The process as claimed in claim 1 wherein said three sequential reaction zones are contained in more than one reactor.

4. The process of claim 1 and wherein said process includes the step of cracking said oil following said demetalation and desulfurization step, said cracking being done at 800° to 1500° F temperature, 1 to 5 atmospheres pressure and a space velocity of about 1 to 1000 WHSV.

5. The process of claim 1 and wherein said process includes the step of coking said oil following said demetalation and desulfurization step, said coking being done at 800° to 1100° F temperature and 1 to 10 atmospheres pressure.

6. The process of claim 1 and wherein said process includes the step of hydrocracking said oil following said demetalation and desulfurization step, said hydrocracking being done at 400 to 1000° F temperature and 100 to 3500 psig pressure.

* * * * *